United States Patent [19]

Koch et al.

[11] Patent Number: 4,646,870
[45] Date of Patent: Mar. 3, 1987

[54] REMOTE CONTROL DEVICE OF A GEAR-BOX FOR MOTOR VEHICLES WITH INCORPORATED COMPRESSED-AIR SYSTEM

[75] Inventors: Siegfried Koch; Jürgen Adams, both of Villingen-Schwenningen; Wolf-Dieter Goedecke, Bachweg 12, D-7731 Unterkirnach, all of Fed. Rep. of Germany

[73] Assignee: Wolf-Dieter Goedecke, Fed. Rep. of Germany

[21] Appl. No.: 732,376

[22] PCT Filed: Sep. 14, 1984

[86] PCT No.: PCT/DE84/00192
§ 371 Date: May 9, 1985
§ 102(e) Date: May 9, 1985

[87] PCT Pub. No.: WO85/01255
PCT Pub. Date: Mar. 28, 1985

[30] Foreign Application Priority Data

Sep. 15, 1983 [DE] Fed. Rep. of Germany ....... 3333346

[51] Int. Cl.⁴ ............................................. B60K 20/10
[52] U.S. Cl. ................................................. 180/336
[58] Field of Search ................. 180/336, 6.48; 74/504, 74/531

[56] References Cited

U.S. PATENT DOCUMENTS 3,954,146 5/1976 Smemo ................................. 180/336
4,506,560 3/1985 Treichel .............................. 180/336

FOREIGN PATENT DOCUMENTS 0059853 12/1982 European Pat. Off. .
0108572 10/1983 European Pat. Off. .
3128266 2/1983 Fed. Rep. of Germany .
1432945 2/1966 France .
2084302 12/1971 France .
 635278 3/1983 Switzerland .

Primary Examiner—Richard A. Bertsch
Attorney, Agent, or Firm—Kanz Scherback & Timmons

[57] ABSTRACT

The invention relates to a remote control device of a gear-box for motor vehicles with incorporated compressed-air system. A gear-shifting gate with servo-pneumatic control provided at the gear-box for setting the gears comprises substantially two working cylinders controlled by servo-valves whose travels are signalled via position indicator switches. A gearshift lever console in the driver's cabin transmits the shifting commands via position indicator switches to electronic control means which in turn control the gear-shifting gate at the gear-box. For feeding back to the gearshift lever the shifting states prevailing at the gear-box, a working cylinder is provided in the gearshift lever console which acts directly on the gearshift lever via a mechanical link.

7 Claims, 5 Drawing Figures

REMOTE CONTROL DEVICE OF A GEAR-BOX FOR MOTOR VEHICLES WITH INCORPORATED COMPRESSED-AIR SYSTEM

The present invention relates to a remote control device of a gear-box for motor vehicles with incorporated compressed air system. As is generally known, shifting of the gears of a motor vehicle gear-box is effected by means of a gearshift lever arranged in the immediate neighborhood of the driver's seat, via mechanical levers and linkages. Regardless of the arrangement of the driver's seat relative to the gear-box in the engine compartment, extensive shift linkages are required for transmitting the shifting movements. The linkage has to transmit the shifting movement performed on the so-called gearshift lever with high precision to the gear-shifting gate of the gear-box, via a plurality of links. Especially in the case of heavy commercial vehicles or buses, the said shifting linkages have often to bridge distances of several meters. This means that apart from the precision required for the transmission of shifting movements over several links, the space required for accommodating the shifting linkages is also quite considerable. The weight of the shifting linkage from the driver's position to the gear-box is substantial, in particular in the case of rear-engined vehicles, and contributes also towards increasing the fuel consumption. Finally, such a mechanical transmission of the shifting movements requires sensitive, experienced manoeuvering of the gearshift lever by the driver if damage to the gearshift linkage and the gear-box itself is to be prevented.

While servo-control assistance is available already for the operation of other motor vehicle functions, it is desirable to introduce a certain automation of the switching functions also in the area of the drive so as to facilitate the related manoeuvering operations. To obtain in particular easy motion and the desired facility of operation, one normally makes use of servo-control mechanisms. The latter depend on electromotive or hydraulic actuating drives. On this basis, servo-brake systems and power steering drives, for example, have been introduced heretofore in motor vehicles. Because of the rough operating conditions prevailing in motor vehicles and/or in heavy commercial vehicles, due to weather influences and vibration, extreme demands are placed on the hydraulic components, such as servo-valves and servo-drives, and sealing problems, for example, cannot always be solved for long service life. Untight points in the hydraulic pressure system lead, however, to losses of pressure fluid and finally to failures of the functions to be transmitted by the control member. A solution is sought in such cases by providing additional pressure fluid, for example brake fluid, in separate reservoirs to compensate for the loss of pressure fluid resulting from untight points, so that the loss of pressure fluid in the system is made up by pressure fluid supplied from the pressure-fluid reservoir. In addition to systems using hydraulic transmission networks, power transmission systems using pneumatic transmission networks are also used, in particular in heavy commercial vehicles. The advantages of a pneumatic servo-valve over electromotive or hydraulic servo-drives are obvious. They consist in the capability of transmitting high forces, long strokes combined with high speed and acceleration, to mention a few properties only. Pneumatic transmission systems are rugged and distinguish themselves by smooth operation. When using suitable actuating cylinders, high positioning accuracies can be achieved. Considering that medium and heavy commercial vehicles are equipped with a compressed-air system as standard equipment, it is possible to make use of the existing pneumatic system for supporting and automating for example the manoeuvering functions in the drive area. In addition to an automatic clutch, it would be imaginable, for example, to provide a pneumatic drive system, assisted by a suitable control, for engaging the individual gears.

Now, it is the object of the present invention to provide a device for the automatic remote control of the gear-shifting functions of a gear-box in heavy commercial vehicles using the existing drive sources, which distinguishes itself by exact, controllable operation, which is space and weight saving and which can be incorporated optimally into the vehicle body as regards the manoeuvering functions and the different vehicle variants.

The solution to this problem is characterized by (a) a gear-shifting gate with pneumatic servo-control arranged directly at the gearbox and comprising a double-acting working cylinder controlled by servo-valves for the linear slot-selection movement and a likewise double-acting working cylinder controlled by servo-valves for the gear-selection movement (secondary slot) with electric position-indicator switches for measuring and signalling a signal chain representing the path stroke of the two working cylinders, (b) a gearshift lever console which can be installed in any desired operating position in the driver's cabin, regardless of the arrangement of the gear-box, and which comprises a gearshift lever with universal joint suspension and a gating corresponding to the number and arrangement of the shiftable gears, and with position indicator switches which can be controlled by the gearshift lever and which are representative of the shifting travels performed as a result of to the operation of the gearshift lever, (bb) the gearshift lever being in driving connection with a double-acting working cylinder that can be controlled by servo-valves, for feeding back to the gearshift lever the shifting states prevailing at the gear-shifting gate, in the direction of the gear selection movement (secondary slot), (c) and electronic control means arranged between the gear-shifting gate and the gearshift lever console for picking up and converting on the one hand the shifting commands supplied from the gearshift lever in the driver's cabin to the gear-shifting gate at the gear-box and, on the other hand, for feeding back the shifting states in a signal-controlled manner via the electronic means to the working cylinder in the console and the gearshift lever.

It is a main objective of the present invention to push the automation of the manoeuvering functions, in particular the gear-shifting functions, by the indicated remote control device for a gear-box so that the driver's attention is set free substantially to concentrate on the traffic. The gearshift lever console comprises in extremely compact form a small gearshift lever with universal joint suspension, which would be imaginable also in every instrument panel, and a small working cylinder which feeds back to the gearshift lever the shifting states of the gear-shifting gate at the gear-box via an electronic signal control through a mechanical link so that the driver gets a feeling of the shifting movements of the gear-box through the gearshift lever in the same manner as if there existed a conventional positive linkage connection between the gearshift lever and the gear-box. Finally, the electronic control means may be accommodated in the gearshift lever console as well. Due to the fact that the gearshift lever console requires only electric lines and a compressed-air line for the transmission of the shifting commands, it may be arranged in any position in the driver's cabin providing the desired ease of operation. In a preferred embodiment of the invention, the console may be arranged on one side and, if desired, in a swivelling housing. The space-saving design in conjunction with the fact that the connections to the gear-box can be realized exclusively by flexible lines permits the installation position to be selected independently of the particular body design of the different vehicle types. This applies without any restriction also to the arrangement of the servo-pneumatic gear-shifting gate which can be combined in a single block. A further variant of the embodiment of the invention even suggests to integrate the proposed gear-shifting gate completely into the gear-box block. The arrangement of the gear-shifting gate and the gearshift lever console in the described form leads altogether to quite considerable savings in weight compared with the conventional linkage design, which in the course of time translates itself into substantial fuel savings. As regards the shifting behavior, both the path stroke (shifting commands from the driver and feed-back signal chain from the gear-box) and the power control in the pneumatic system can be controlled by corresponding translation of the control signals in the electronic control system. Generally, the working cylinders can be controlled via the servo-valves by signal chains supplied by the electronic system because the path stroke of the cylinders is recorded by travel sensors and fed back to the controller and/or the electronic system. So, a path-dependent power control is rendered possible by this arrangement which means that it is, for example, possible to disengage a gear relatively quickly, to approach the next gear quickly up to the synchronization stage, and to synchronize and engage the next gear thereafter at an exactly controllable pressure. Owing to the characteristics of the pneumatic system, it is possible with the proposed arrangement to control precise shifting operations remotely via a precisely adaptable path/power control, through permanent supervision of the electronic control means. In addition, the use of the electronic control means permits a still further degree of automation in the drive area, for example as regards the engaging and disengaging processes, and optimum gear selection.

One embodiment of the invention will be described hereafter with reference to the drawings in which.

Figure 1:
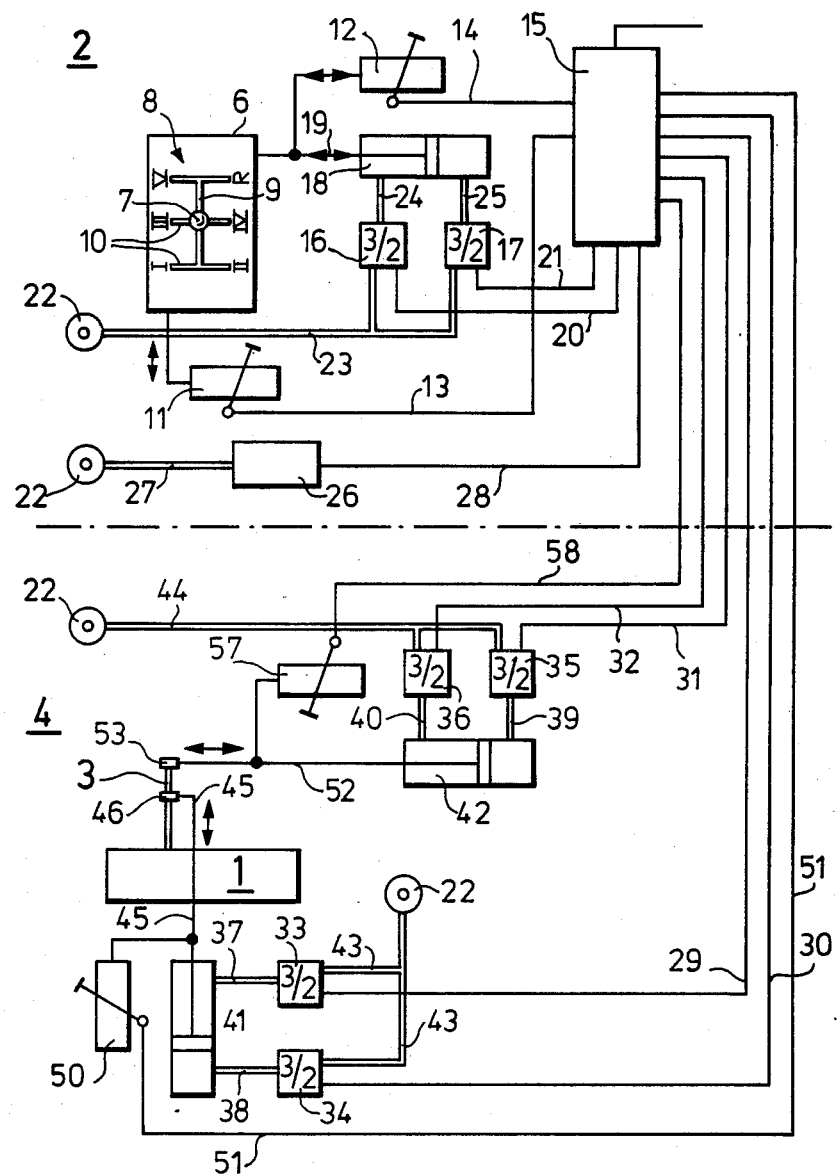
FIG. 1 shows a block diagram of the remote control for the gear-box, with the gearshift lever console arranged in the driver's cabin, including electronic control means and a gear-shifting gate arranged remotely in the engine compartment.

In FIG. 1 a block diagram can be seen representing in a schematic manner a remote control device of a gear-box 1 for a motor vehicle with incorporated compressed-air system. The whole arrangement is subdivided into devices accommodated in the driver's cabin 2 within reach of the driver, and the units operating a gear-shifting shaft 3 which are arranged in the immediate neighborhood of the remote gear-box 1 in the engine compartment 4 and which can be controlled from the driver's cabin. In the driver's cabin 2, a gearshift lever console 6 is incorporated in a housing 5 which is arranged in convenient operating position. A gearshift lever 7 with universal joint suspension may be moved by means of a gating 8 along a so-called main slot 9 (idle speed) and secondary slots 10 (speed selection) into the individual shifting positions, depending on the number and arrangement of the shiftable gears. The shifting travels of the gearshift lever 7 are transmitted to position indicator switches 11, 12 via mechanical links. According to the block diagram of FIG. 1, the shifting travels of the gearshift lever 7 along the main slot or in the idle gear are represented by the position indicator switch 11, while the shifting travels along the secondary slot 10 for speed selection are represented by the position indicator switches 12. The position indicator switches 11, 12, which operate in the manner of a rotary potentiometer, are connected with central electronic control means 15 via lines 13, 14. As appears from FIG. 1, the gearshift lever console 6 comprises further a double-acting working cylinder 18 that can be controlled by two servo-valves 16, 17 and which is connected with the gearshift lever 7 via a piston rod 19 and performs a feed-back movement in the direction of the gear-selection travel. The electro-pneumatic servo-valves 16, 17 are connected for this purpose via lines 20, 21 with the central electronic control means 15 from which they receive an appropriately processed signal chain representative of the gear state of the gear-box 1 prevailing at any time. The compressed air required by the servo-valves 16, 17 and the working cylinder 18 is supplied via the compressed-air line 23 and the compressed-air control lines 24, 25 from a compressed-air system 22 which is provided in any truck as standard equipment and which in the drawing is represented symbolically only. The supply of compressed air is controlled by a pneumatically operated switch 26 connected on the one hand with the compressed-air system 27 via a compressed-air line 22 and, on the other hand, with the electronic control means 15 via a signal line 28.

The shifting commands supplied from the gearshift lever 7 via the position indicator switches 11, 12 to the electronic control means 15 are translated by the electronic control means 15 and transmitted as signal chains via lines 29, 30 and 31, 32 to so-called 3/2 directional control servo-valves 33, 34 and 35, 36 in the engine compartment 4. The supply connection to the compressed-air system 22 is realized for the servo-valves 33, 34 by a compressed-air line 43 and for the servo-valves 35, 36 by a compressed-air line 44. The servo-valves 33, 34 and 35, 36 are connected by compressed-air control lines 37, 38 and 39, 40 with double-acting working cylinders 41 and 42.

Figure 4:
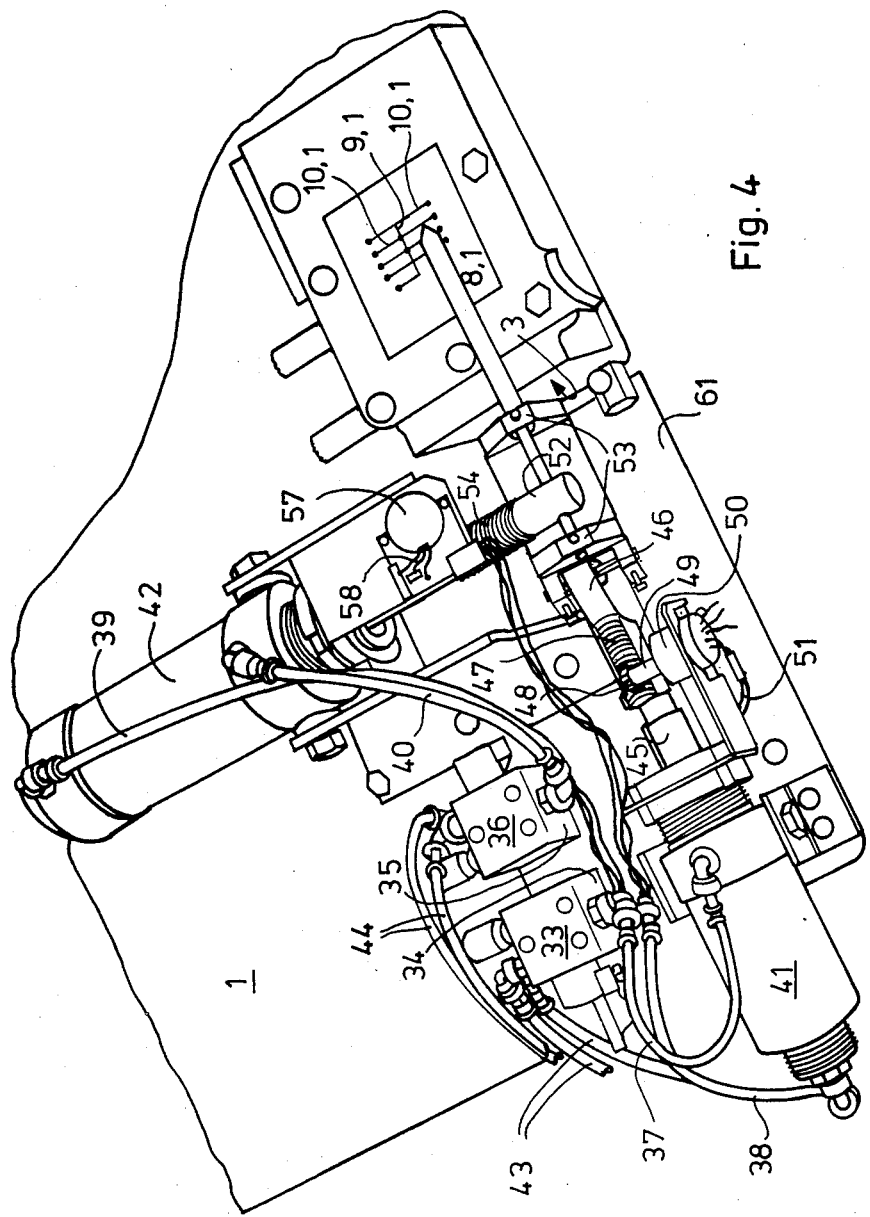
FIG. 4 is a top view of a gear-shifting gate with servo-pneumatic control arranged directly at the gear-box.
Figure 5:
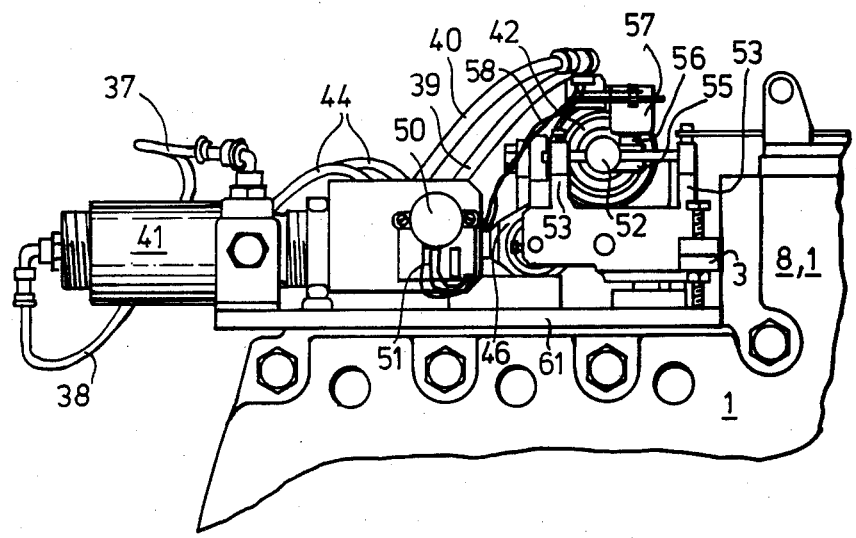
FIG. 5 is a side view of a gear-shifting gate with servo-pneumatic control arranged at the gear-box.

A piston rod 45 projecting from the working cylinder 41 is coupled by a universal joint 46 with the gear-shifting shaft 3 projecting from the gear-box 1 (see also FIGS. 4 and 5). The strokes of the piston rod 45 serve to select and/or set the main slot 9/1 at the gear-box 1 to the position selected by the gearshift lever 7 via the electronic control means 15. The travel in the axial direction performed for this purpose by the gear-shifting shaft 3 is transmitted via a gearing 47 on the piston rod 45 to a gear 48 which is secured against rotation on a setting shaft 49 of a position indicator switch 50. In the embodiment shown in FIG. 4, a rotary potentiometer is used as position indicator switch 50. Accordingly, the travel is measured by the position indicator switch 50 as a function of the stroke performed by the piston rod 45, fed back to the electronic control means 15 via a line 51 and compared with the position of the gearshift lever 7.

A piston rod 52 projecting from the working cylinder 42 is provided at the gear-box 1 at a right angle and in vertically offset arrangement to the gear-shifting shaft 3 and articulated, but secured against rotation, on swinging arms 53 connected with the gear-shifting shaft 3 so that the strokes performed by the piston rod 52 transmit a rotary movement to the gear-shifting shaft 3 via the swinging arms 53. The piston rod 52 also carries a gearing 54 transmitting the travel via a gear 55 and a setting shaft 56 to a further position indicator switch 57 which again takes the form of a rotary potentiometer, as can be seen in FIGS. 4 and 5. The value measured by the position indicator switch 57 is representative of the rotation of the gear-shifting shaft 3, which means that the working cylinder 42 performs the travels of the secondary slot 10/1 and shifts the gears. The signal chain emitted by the position indicator switch 57 is likewise fed back via a line 58 to the central electronic control means 15. During the movements into the individual gears or secondary slots 10/1 at the gear-box under the action of the working cylinder 42, the shifting mechanism enters a synchronization phase. This state is fed back permanently to the electronic control means 15 which in turn feeds back the power/path relationships prevailing at the gear-box 1 to the gearshift lever 7, via a control function through the lines 20, 21 and the small working cylinder 18. This permits the gear to be synchronized and engaged at a precisely controlled pressure and the shifting state and the gear position encountered at the gear-box 1 to be fed back to the gearshift lever 7 in a manner that can be supervised by the driver.

Figure 2:
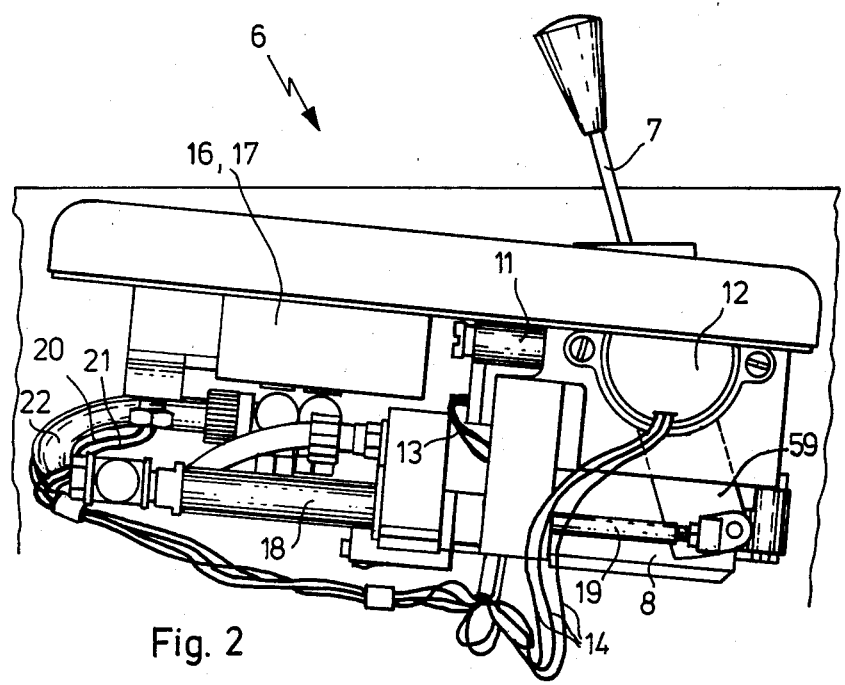
FIG. 2 shows a side view of the gearshift lever console with position indicator switches and a working cylinder for feeding back the gear states to the gearshift lever.

FIG. 2 shows the details of the gearshift lever console 6. The gearshift lever 7 is suspended in sort of a universal joint and guided in a gating 8 through the gearshift lever 7 which is extended beyond the said joint. The action of the gearshift lever 7 along the pre-determined paths which as is generally known extend in one plane and at right angles relative to each other, is transmitted for example as a rotary angle movement via a shaft 59 to a position indicator switch 11, 12 which in the embodiment shown in FIGS. 2 and 3 takes the form of a rotary potentiometer. In order to give the driver the possibility to check the actual shifting state prevailing at the remote gear-box 1 during shifting, means are provided for feeding back the travels and power conditions from the gear-box 1 to the gearshift lever 7. These means consist of a double-acting working cylinder 18 arranged in the gearshift lever console 6 whose piston rod 19 is connected in driving relationship directly with the gearshift lever 7, via a lever arm 59. The working cylinder 18 is controlled by two servo-valves 16, 17 controlled by a signal chain supplied from the central electronic control means 15 via lines 20, 21. Thus, precisely controllable feed-back of the power/travel conditions of the gear-box can be achieved. Such feed-back is of great importance in particular for the linear movement in the direction of gear selection because it is important here that the synchronization phase be initiated at a conveniently controllable pressure and that, when synchronization has been achieved, the gear be engaged smoothly, i.e. at reduced pressure.

To ensure that these processes are controlled with sufficient precision, the electronic control means 15 is provided between the gear-shifting gate 8/1 at the gear-box 1 and the gearshift lever console 6 in the driver's cabin 2. The electronic control means 15 serves on the one hand for picking up and translating the shifting commands supplied from the gearshift lever 7 in the driver's cab 2 to the gear-shifting gate 8/1 with servo-pneumatic control provided at the gear-box 1 in the remote engine compartment 4, and on the other hand for signal-controlled feeding-back of the shifting state of the gear-box 1 to the working cylinder 18 and lastly the gearshift lever 7.

Figure 3:
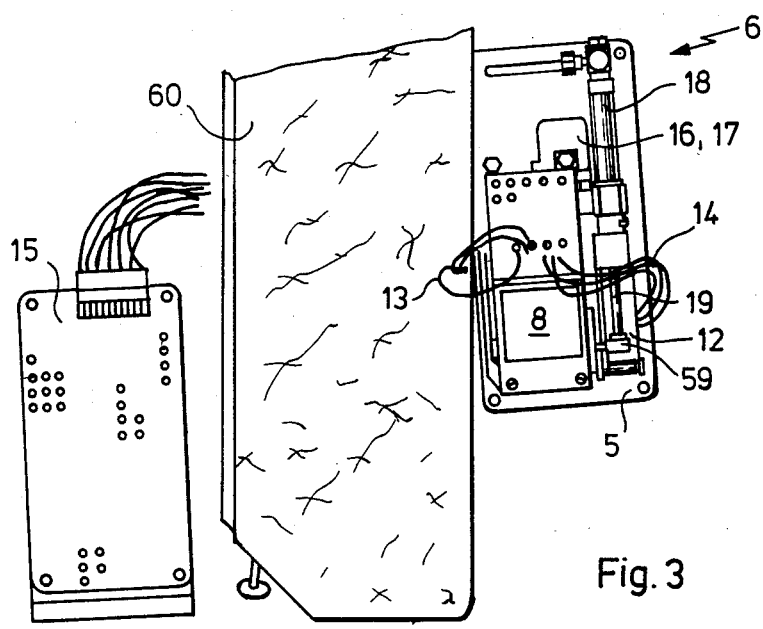
FIG. 3 shows an arrangement for accommodating the gearshift lever console and the electronic control means in a swivelling housing.

According to a preferred embodiment shown in FIG. 3, the electronic control means 15 can be accommodated together with the gearshift lever console 6 in a swivelling housing 60 so that the most convenient operating position for the driver or for servicing can be obtained. This has been rendered possible only due to the fact that all connections between the different details of the arrangement consist exclusively of electric and compressed-air lines which can be accommodated without any problems and in a space-saving manner.

According to the arrangement of the embodiment shown in FIGS. 4 and 5, the gear-shifting gate 8/1 with servo-pneumatic control, which comprises two working cylinders 41, 42 controlled by servo-valves 33, 34, 35, 36 and projecting piston rods 45, 52, can be pre-fabricated as actuating drives combined in a block 61, for example on a mounting plate, and can be flange-mounted to a gear-box of the conventional type. It is also imaginable and advantageous to improve the design still further by incorporating the servo-pneumatic drive components into the mechanical gear-shifting gate or the gear-box block 1.

I claim:

1. Apparatus for the remote control of a motor vehicle gear box comprising:
   a system for supplying compressed air,
   a gear box including gears,
   actuating means directly attached to said gear box for shifting said gears in said gear box, said actuating means comprising a first double-acting working cylinder for axial displacement of said actuating means in a first coordinate direction and a second double-acting working cylinder for axial displacement of said actuating means in a second coordinate direction perpendicular to said first direction;
   first and second compressed air lines connecting said compressed air supply system to said first and second working cylinders, respectively;
   first and second servo-values, arranged in said first and second compressed air lines, respectively, selectively to apply compressed air to said working cylinders to actuate said working cylinders;
   means for generating first and second electrical signals, respectively, corresponding to said actual displacement of said working cylinders and said actuating means in the said first and second coordinate directions;

a console mounted in a driver's cabin within said motor vehicle remote from said gear box and including a manually operated gear-shift lever, said lever being moveable in coordinate directions corresponding to said first and second coordinate directions;

means responsive to coordinate positions of said lever to generate electrical signals representative of said positions;

electronic control means responsive to said electrical signals from said means responsive to coordinate positions of said lever for controlling said servovalves to displace said actuating means in a master-slave relationship with respect to said lever; and means including a third working cylinder for feeding back to said lever shifted states of said actuating means in said second coordinate directions, said electronic control means being responsive to said first and said second electrical signals to control the operation of said third working cylinder.

2. The apparatus of claim 1 in which said means for generating said first and said second electrical signals comprise potentiometers responsive to movement of said actuating means.

3. The apparatus of claim 2 in which each potentiometer is of the rotary type having a gear in engagement with its related working cylinder.

4. The apparatus of claim 1 in which said means including a third working cylinder also includes a third compressed air line and third servo valves connected in said third line responsive to said electronic control means.

5. The apparatus of claim 1 in which said means responsive to coordinate positions of said lever includes first and second position indicating means coupled to said lever.

6. The apparatus of claim 5 in which said first and second position indicating means are comprised of rotary potentiometers.

7. The apparatus of claim 1 in which said electronic control means includes comparing means.

* * * * *